Aug. 23, 1932.  S. W. MILLER  1,873,847
WELDING ROD
Filed Feb. 6, 1928
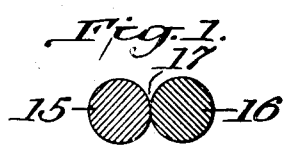
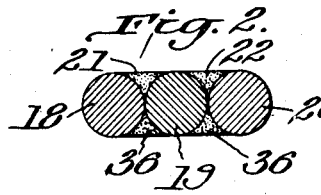
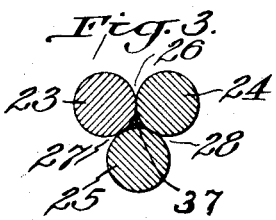
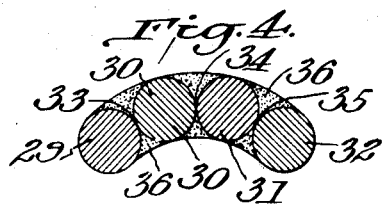
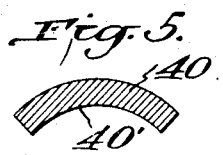
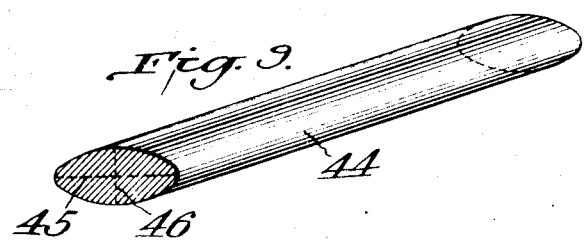
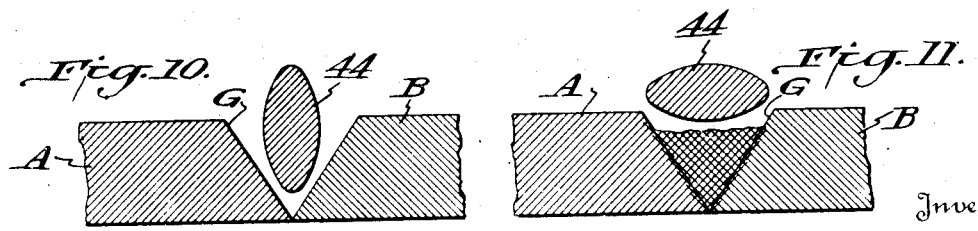
Inventor:
Samuel W. Miller,
By Byrnes, Townsend & Bickerstein,
Attorneys.

Patented Aug. 23, 1932

1,873,847

UNITED STATES PATENT OFFICE

SAMUEL W. MILLER, OF HOLLIS, NEW YORK, ASSIGNOR TO UNION CARBIDE & CARBON RESEARCH LABORATORIES, INC., A CORPORATION OF NEW YORK

WELDING ROD

Application filed February 6, 1928. Serial No. 252,314.

This invention relates to improvements in metallic welding rods adapted to be fused by means of a high temperature gas flame or an electric arc and deposited on heated solid metal for the purpose of welding, filling or the like.

Generally speaking, the thickness of the work being welded by a gas flame, such as an oxy-acetylene flame, determines the size of the welding flame which should be employed, although practical difficulties are encountered in designing very large welding nozzles or heads for welding very thick work, so there is a practical limit to the size of the welding flame which may be produced. It has been customary to use a single round metallic rod for welding purposes, but welding rods of very large diameter are seldom carried in stock or used for welding, no matter how thick the work may be or what the size of the flame may be. For example, the usual rod for welding steel of all thicknesses from one-half inch up is one-quarter inch in diameter. Considerable heat is therefore wasted and progress is slow when the usual single round wire is used with larger flames for welding the thicker work. For heavy steel welding, where a large flame is required to keep the work properly heated, two one-quarter inch rods have been secured together parallel to each other by binding wires. The objection to this wiring together is that the welder almost always bends the rods at some point about nine inches from the work to avoid the strain of holding straight rods nearly vertical to the work and to keep his hand holding the rods from the heat. This bending of the two wired-together rods causes the ends that are being melted off to separate, resulting in delays and difficulties in manipulating the rods.

The principal object of this invention is to provide an improved welding rod whereby weld metal may be more rapidly and economically deposited than in the use of the common welding rod of circular cross-section, especially when welding metal of considerable thickness or when filling large cavities. Another object is to provide a welding rod of larger cross-sectional area than the well-known circular welding rod, and to provide a rod which has one axis of its cross-section longer than the axis perpendicular thereto, and one which preferably is thicker intermediate its lateral edges than adjacent such edges, whereby (1) less gas or electric current is consumed per pound of metal deposited, (2) the seat of the welding flame may be confined and more fully utilized, (3) the hottest part of the welding flame may be applied to the thickest part of the rod, and (4) welding may be facilitated by turning the rod about its central longitudinal axis as occasion demands to present either the narrow or the wider side of the rod to the V-shaped groove between the bevelled edges of the work to be welded.

The above and other objects and the novel features of this invention will be apparent from the following description and the accompanying drawing, in which:

Figs. 1 to 8 inclusive are cross-sectional views of metallic welding rods embodying various features of this invention;

Fig. 9 is a perspective view of a preferred form of metallic welding rod embodying this invention; and Figs. 10 and 11 are sectional views diagrammatically illustrating positions of my preferred type of welding rod at different stages when welding together two thick plates having opposed bevelled edges.

As I have already stated, certain objections are encountered in welding with two rods wired together. When such rods are bent to provide a handle whereby the welder may conveniently hold them at the desired inclination to the work, the rods, especially at the heated ends, spread apart, impeding the welder in his work as well as causing non-uniform welds. To overcome such objections I permanently unite in parallel contacting relation two or more rods of the same length, as shown in Figs. 1 to 4 inclusive. The permanent unions between the several parallel rods may consist of spot welds at short intervals apart, say two inches, throughout their length; or a continuous longitudinal joint between the parallel rods may be produced by electric resistance welding. Two or more welding rods permanently joined together in this way may be bent as desired and will stay together. As shown in Fig. 1, the rods 15 and 16 are permanently united by a longitudinal joint 17; in Fig. 2, the rods 18, 19, 20 are permanently united into a unitary welding rod by longitudinal joints 21 and 22; in Fig. 3 the rods 23, 24 and 25 are arranged with their longitudinal axes at the apexes of a triangle and are permanently united into a unitary rod by longitudinal joints 26, 27 and 28; while the rods 29, 30, 31, 32, forming the unitary welding rod shown in Fig. 4, are united by longitudinal joints 33, 34 and 35. In all instances, the joints may be either spot welds or continuous resistance welds, and if desired, the spaces on opposite sides of the joints throughout the length of the composite rods may be filled with suitable fluxing material level with planes tangent to adjoining rods, as indicated at 36 in Figs. 2 and 4 for example. Similarly, suitable flux may be introduced into the space between the rods of Fig. 3, as indicated at 37, with or without flux in the outer V-shaped spaces adjacent the joints 26, 27 and 28. The flux is thus carried by and distributed throughout the length of the composite rod and is automatically supplied to the weld as required.

More or less oxide and slag may be produced at the weld-junctions between the rods shown in Figs. 1 to 4 inclusive which is objectionable in some instances because such oxide or slag may get into the weld metal that is deposited from the rod. To overcome this, I provide a unitary double welding rod which may be drawn or otherwise formed to have a cross-section somewhat similar to that of a dumb-bell, as shown at 38 in Fig. 6. If desired, flux 39 may be applied lengthwise of and to opposite sides of the web between the lobes of the rod 38.

It will be observed that the welding rods shown in Figs. 1 to 6 inclusive are considerably wider than a single rod of circular cross-section having the same area. In gas welding especially, it is decidedly advantageous to employ a welding rod having one cross-sectional dimension substantially greater than the other. Particularly on this work, welding with the common single rod is uneconomical and slow because a large proportion of the heat passes the rod and is not effective in melting the rod nor sufficient to keep the base metal in a state of fusion to receive the melted rod deposited thereon. By presenting my improved composite rod to the work in such a manner that its broad side faces the weld, more of the flame and heat are confined between the rod and the weld and reflected back to the work and weld, so that heat otherwise wasted may be utilized for melting the rod and keeping the weld and base metal at a fusion temperature, resulting in faster welding and greater economy. Moreover, by turning this type of rod so as to present its narrow side to the bottom of the V-groove, the welder may get to the bottom of the groove as easily as with a single round rod.

In some welding operations I find it advantageous to provide the welding rod with a concave lower face which serves to confine the heat better than a flat broad face. In Fig. 4, for example, the several rods 29, 30, 31 and 32 are permanently united so their longitudinal axes and the weld unions lie on a curve, whereby one side of the composite rod is concave throughout its length. Another type of welding rod embodying this feature is shown in Fig. 5, wherein the rod 40 consists of a substantially rectangular metal strip rolled, bent or otherwise grooved so as to form a concave side 40', extending lengthwise of the rod.

Inasmuch as the intensity of the heat of the oxy-acetylene welding flame is greatest at the point of the central white cone, I have found that the ideal cross-sectional shape of welding rod for general purposes is one which has one cross-sectional dimension substantially greater than the other, and a portion intermediate the lateral edges substantially thicker than the portions along such lateral edges. Hence, in welding, the thicker part of the rod will be the part which is subjected to the heat almost continuously and is usually opposite the intensest part of the flame. Figs. 8 and 9 illustrate improved welding rods embodying these features of my invention. The section of the welding rod 41, as shown in Fig. 8, is in a plane perpendicular to the longitudinal axis of the rod, and is in the form of a parallelogram, two opposite angles of which are acute, the diagonal 42 joining their apex being the longest dimension of the section of the rod. The thickest section of the rod as used is along its diagonal 43, and the rod is so formed that every short diagonal at all other cross-sections of the rod is in the same plane with the diagonal 43, while every long transverse diagonal along the rod is in the same plane with the diagonal 42.

The metallic welding rod 44 shown in Fig. 9 is the preferred form. A section taken perpendicular to this rod at any point lengthwise of its axis is an ellipse, the major and minor axes 45 and 46 of which respectively measure the width and thickness of the rod. The major axes of all elliptical sections of the rod lie in the same plane, and a plane through the longitudinal axis of the rod 44 and through the minor axis 46 includes all other minor axes.

Figs. 10 and 11 diagrammatically illustrate a welding operation wherein the use of my improved rod is particularly advantageous. Two relatively thick metal plates A and B, to be welded together, are bevelled as usual along their opposed edges to form a V-shaped groove G to receive the weld metal deposited by the rod 44, for example. To properly weld at the bottom of the V it is important to get the rod close to such bottom, which may be done by turning the rod so that its long dimension is parallel to the height of the V, as shown in Fig. 10. After considerable weld metal has been filled into the groove, the width of the top surface of the weld is much greater and at the top of the groove with a 90° bevel such width is twice the thickness of the plate. With an ordinary rod, as already explained, it is necessary to work first on one side of the weld and then on the other, considerable heat is wasted, and it is difficult to keep the weld and adjoining plate edges in a fused state for proper welding. By simply turning my improved rod 90° about its longitudinal axis so that its wider side faces the weld, a greater width of the weld is covered by the rod, it is not necessary to move the rod so much from side to side over the weld, the confined and reflected heat will be sufficient to keep the weld metal in a molten condition, and the bevelled faces of the plates may be more easily kept at a welding temperature without overheating the plates back from the edges. The results of tests conducted with my improved welding rod clearly show that the amount of welding gases or current used is considerably reduced by thus utilizing heat otherwise wasted, and the amount of metal deposited in a given time is considerably increased.

For many purposes I have also found that a welding rod of oval cross-section, as shown at 47 in Fig. 7, is well adapted for welding and affords the advantages already set forth. The major and minor axes 48 and 49 are, respectively, in the same plane with the corresponding axes of all perpendicular cross-sections of the rod 47, as in the elliptical rod for example, so that as these rods are melted down their broader sides or narrower sides, as the case may be, will always be in the same position relatively to the weld and the flame from the welding blowpipe. It will be obvious that the rods 41 and 47 as well as other rods herein shown may be used in the manner illustrated in Figs. 10 and 11.

While it is desirable in most instances that the plurality of integrally united rods shown in Figs. 1 to 4 shall have the same metallic composition, I may unite rods of different composition in the same manner to provide a composite rod that will deposit weld metal of a composition that differs from any of the individual rods which make up the unitary rod.

For convenience, I may herein designate the width dimension taken perpendicular to the longitudinal axis of the rod as the major sectional axis of the rod, and the thickness dimension as the minor sectional axis.

I claim:

1. A welding rod composed of a homogeneous elongated body of metal in which the width dimension taken perpendicular to the longitudinal axis of the rod is substantially greater than the thickness dimension taken perpendicular to such width, said rod having a portion intermediate its opposite lateral edges which is thicker than the portions adjoining such edges.

2. A welding rod substantially dumb-bell shape in transverse cross-section.

3. A welding rod having a transverse cross-section which is substantially a parallelogram at every point lengthwise of the rod, the major axis of said section being substantially greater than the minor axis, and all major and minor axes lying in the same planes, respectively.

4. A welding rod comprising a homogeneous elongated body of metal in which a section perpendicular to the longitudinal axis of the rod is elliptical in shape, whereby the central portion of the rod through the minor axis of the ellipse is thicker than the parts of the rod adjacent the ends of the major axis.

5. A welding rod according to claim 4, wherein the major axis of every such perpendicular transverse section of the rod is substantially greater than the minor axis, and the major axes of all sections are in the same longitudinal plane through the longitudinal axis of the rod.

6. A welding rod comprising a homogeneous elongated body of metal in which the sections taken perpendicular to the longitudinal axis are substantially elliptical in shape.

7. A welding rod comprising a homogeneous elongated body of metal in which the sections taken perpendicular to the longitudinal axis are figures having unequal axes of symmetry which will coincide with the axes of symmetry of a circumscribed rectangle, the volume of metal in a given length of the rod being less than the volume of an equal length of said rectangular rod.

8. A welding rod comprising a homogeneous elongated body of metal having two curved relatively wide opposing faces and two curved relatively narrow opposing faces, the wide faces being outwardly convex with respect to a plane passing through the longitudinal axis of the rod and parallel to a plane which is tangent to one of the wide faces.

9. A welding rod comprising a homogeneous elongated body of metal in which the sections perpendicular to the longitudinal axis are figures having major and minor axes of unequal length, the surfaces which terminate the minor axis being bulged outwardly with respect to the plane determined by the major axis and the longitudinal axis.

10. A welding rod comprising a homogeneous elongated body of metal in which the sections perpendicular to the longitudinal axis are figures having major and minor axes of unequal length, at least one of the surfaces which terminates the minor axis being bulged outwardly with respect to the plane determined by the major axis and the longitudinal axis.

11. A welding rod composed of a homogeneous elongated body of metal in which the width dimension taken perpendicular to the longitudinal axis of the rod is substantially greater than the thickness dimension taken perpendicular to such width and in which one of the wider faces of said rod is grooved or concave throughout the length of the rod.

12. A welding rod composed of a homogeneous elongated body of metal in which the width dimension taken perpendicular to the longitudinal axis of the rod is substantially greater than the thickness dimension taken perpendicular to such width and in which a recess extends lengthwise of said rod, said recess containing flux.

In testimony whereof I affix my signature.

SAMUEL W. MILLER.